(12) United States Patent
Shilpiekandula et al.

(10) Patent No.: US 7,966,252 B2
(45) Date of Patent: Jun. 21, 2011

(54) METHODS AND SYSTEMS FOR PROVIDING HYBRID ARM INDICES

(75) Inventors: Vikas Shilpiekandula, New York, NY (US); Andrew Hochherr Miller, New York, NY (US)

(73) Assignee: Barclays Capital Inc., New York, NY (US)

( * ) Notice: Subject to any disclaimer, the term of this patent is extended or adjusted under 35 U.S.C. 154(b) by 0 days.

(21) Appl. No.: 11/541,130

(22) Filed: Sep. 28, 2006

(65) Prior Publication Data

US 2007/0078743 A1  Apr. 5, 2007

Related U.S. Application Data (60) Provisional application No. 60/721,786, filed on Sep. 28, 2005.

(51) Int. Cl.
*G06Q 40/00* (2006.01)
(52) U.S. Cl. .................................. 705/38; 705/36 R
(58) Field of Classification Search .................. 705/38
See application file for complete search history.

(56) References Cited

U.S. PATENT DOCUMENTS

| 6,615,187 | B1* | 9/2003 | Ashenmil et al. ............ 705/36 R |
| 2004/0225597 | A1* | 11/2004 | Oppenheimer et al. ......... 705/38 |
| 2006/0271473 | A1* | 11/2006 | Pollock et al. .................. 705/38 |
| 2007/0192226 | A1* | 8/2007 | Uhlmann et al. ............ 705/36 R |

OTHER PUBLICATIONS

Sally A. Runyan; "Analysts disagree over the impact of turnover on prepayments" Asset Sequritization Report. New York: Jul. 5, 2004. p. 1.*

Frank J. Fabozzi; "The Structure Finanace Market: An Investor's Prespective" Financial Analysts Journal. Charlottsvilles: May/Jun. 2005. vol. 61, Iss. 3; p. 27, 14 pgs.*

"Fitch Rates BOAMSI $573.2MM Series 2005-E"; Business Wire. new York: May 31, 2005. p. 1.*

* cited by examiner

*Primary Examiner* — Hani Kazimi
*Assistant Examiner* — Hatem Ali
(74) *Attorney, Agent, or Firm* — Morgan Lewis & Bockius LLP (57) ABSTRACT

In at least one aspect, the invention comprises constructing one or more hybrid adjustable rate mortgage aggregates based on one or more of: agency, program, coupon, and origination year; for each of one or more of the aggregates, constructing one or more sub-aggregates based on one or more of: rate-index, capitalization structure, and existence of interest-only feature; mapping pools of adjustable rate mortgages to the aggregates and sub-aggregates; constructing an index based on the mapping; and pricing the index.

24 Claims, 5 Drawing Sheets

FIG 1. Strong Growth in Hybrid ARMS, Net Cumulative Growth, $ billion

FIG. 2. Prepayment on Hybrid ARMs and Fixed-Rates, % CPR

FIG. 3. Hybrid Sub-Aggregate Nomenclature

| F 3 A O 42 03 | |
|---|---|
| | Example |
| Agency | F for FN, H for FH and G for GN |
| Program | 3 for 3/1, 5 for 5/1, 7 for 7/1 and A for 10/1 |
| Rate Index – Caps | A to L depending on the rate index and cap structure (see table below)* |
| Interest Only | O for IO and N for level pay |
| Coupon | 42 stands for 4.25; the second number stands for an 8th |
| Origination Year | 03 stands for 2003 |

* Rate Index – Cap Nomenclature

| | Interest Rate Caps | | | | |
|---|---|---|---|---|---|
| Rate Index | 225 | 525 | 226 | 526 | 115 |
| 1-year LIBOR | A | B | E | F | M |
| 1-year CMT | C | D | G | H | N |
| 6-month LIBOR | I | J | K | L | O |

EXCESS AND PERIODIC RETURNS SCREEN FOR HYBRID ARMS

Indices
Index Analysis Reports Quant Portfolio Strategy

Hybrid ARM Index  ⊞Group Time Series  ⊞Group Returns Calculator

Instructions
- Select the Index group that you want to analyze from the dropdown list or the Index Map.
- To Change the Index group, date, currency, or return type: make one or more selections, then click GO.
- To change the columns displayed in the group report, click on the view names in the bar below.
- To analyze a specific Index, click on an Index name in the group report.

Index Group [Hybrid ARM Index ▼]  ☐Index Map  ☐Edit Custom Group
As Of [Jul 12, 2005]  Currency [Default ▼]  Returns Type [Default ▼]
[Go]

| | Current Returns | Excess and Periodic Returns | Basic Statistics | Other Statistics | Sector Weights | Custom Views: | | Customize |

| | Number Issues (Returns) | MTD Total Return | YTD Total Return | 3 Month Tot Ret | 6 Month Tot Ret | 12 Month Tot Ret | Since Inception Tot Ret | Inception (or Start) Date | MTD Excess Return | YTD Excess Return | Currency | Return Type |
|---|---|---|---|---|---|---|---|---|---|---|---|---|
| Hybrid Arms Index | 1,165 | -0.17 | -0.17 | n/a | n/a | n/a | -0.17 | 6/1/05 | -0.01 | -0.01 | USD | Unhedged |
| By Sector | | | | | | | | | | | | |
| FHLM | 364 | -0.21 | -0.21 | n/a | n/a | n/a | -0.21 | 6/1/05 | 0.00 | 0.00 | USD | Unhedged |
| FH 3/1 | 51 | -0.15 | -0.15 | n/a | n/a | n/a | -0.15 | 6/1/05 | 0.00 | 0.00 | USD | Unhedged |
| FH 5/1 | 187 | -0.21 | -0.21 | n/a | n/a | n/a | -0.21 | 6/1/05 | -0.00 | -0.00 | USD | Unhedged |
| FH 7/1 | 91 | -0.29 | -0.29 | n/a | n/a | n/a | -0.29 | 6/1/05 | 0.01 | 0.01 | USD | Unhedged |
| FH 10/1 | 35 | -0.29 | -0.29 | n/a | n/a | n/a | -0.29 | 6/1/05 | 0.02 | 0.02 | USD | Unhedged |
| FNMA | 800 | -0.15 | -0.16 | n/a | n/a | n/a | -0.15 | 6/1/05 | -0.01 | -0.01 | USD | Unhedged |
| FN 3/1 | 141 | -0.07 | -0.07 | n/a | n/a | n/a | -0.07 | 6/1/05 | -0.00 | -0.00 | USD | Unhedged |
| FN 5/1 | 412 | -0.15 | -0.15 | n/a | n/a | n/a | -0.15 | 6/1/05 | -0.01 | -0.01 | USD | Unhedged |
| FN 7/1 | 172 | -0.23 | -0.23 | n/a | n/a | n/a | -0.23 | 6/1/05 | -0.01 | -0.01 | USD | Unhedged |
| FN 10/1 | 84 | -0.27 | -0.27 | n/a | n/a | n/a | -0.27 | 6/1/05 | 0.01 | 0.01 | USD | Unhedged |
| GNMA | 12 | -0.12 | -0.12 | n/a | n/a | n/a | -0.12 | 6/1/05 | -0.01 | 0.01 | USD | Unhedged |
| GN 3/1 | 12 | -0.12 | -0.12 | n/a | n/a | n/a | -0.12 | 6/1/05 | -0.01 | 0.01 | USD | Unhedged |
| GN 5/1 | 0 | 0.00 | 0.00 | n/a | n/a | n/a | 0.00 | 6/1/05 | 0.00 | 0.00 | USD | Unhedged |
| GN 7/1 | 0 | 0.00 | 0.00 | n/a | n/a | n/a | 0.00 | 6/1/05 | 0.00 | 0.00 | USD | Unhedged |
| GN 10/1 | 0 | 0.00 | 0.00 | n/a | n/a | n/a | 0.00 | 6/1/05 | 0.00 | 0.00 | USD | Unhedged |

This document is for information purposes only. No part of this document may be reproduced in any manner without the written permission of Lehman Brothers Inc. Under no circumstances should it be used or considered as an offer to sell or a solicitation of any offer to buy the securities or other instruments mentioned in it. We do not represent that this information is accurate or complete, and it should not be relied upon as such. Opinions expressed herein are subject to change without notice.

FIG. 4

BASIC STATISTICS SCREEN FOR HYBRID ARMS

Indices

Index Analysis Reports Guest Portfolio Strategy

Hybrid ARM Index     ☐Group Time Series   ☐Group Returns Calculator

Instructions
- Select the Index group that you want to analyze from the dropdown list or the Index Map.
- To Change the Index group, date, currency, or return type: make one or more selections, then click GO.
- To change the columns displayed in the group report, click on the view names in the bar below.
- To analyze a specific Index, click on an Index name in the group report.

Index Group: *Hybrid ARM Index*    ☐Index Map    ☐Edit Custom Group As Of: Jul 12, 2005    Currency: Default   Returns Type: Default   [Go]

| | Current Returns | Excess and Periodic Returns | Basic Statistics | Other Statistics | Sector Weights | Custom Views: | Customize |
|---|---|---|---|---|---|---|---|

| | Number Issues (Stats) | Mod. Adj. Duration | Average Convexity | Average Coupon | Average Maturity | Average Price | Average OAS | Average Spread | Yield to Worst | Yield to Maturity | Amount Outstanding (MM) | Market Value (MM) | Currency |
|---|---|---|---|---|---|---|---|---|---|---|---|---|---|
| Hybrid Arms Index | 1,185 | 1.77 | -0.99 | 4.38 | 3.13 | 99.95 | 0.54 | 75.3 | 4.65 | 4.65 | 275,729 | 275,975 | USD |
| By Sector | | | | | | | | | | | | | |
| FHLM | 309 | 2.01 | -0.98 | 4.37 | 3.32 | 99.54 | 0.60 | 84.5 | 4.72 | 4.72 | 93,626 | 93,225 | USD |
| FH 3/1 | 61 | 1.69 | -0.67 | 3.76 | 2.62 | 99.40 | 0.66 | 77.7 | 4.63 | 4.63 | 16,044 | 16,070 | USD |
| FH 5/1 | 107 | 1.98 | -0.91 | 4.37 | 3.26 | 99.51 | 0.60 | 82.0 | 4.69 | 4.69 | 56,801 | 55,507 | USD |
| FH 7/1 | 91 | 2.24 | -1.35 | 4.72 | 3.86 | 99.78 | 0.66 | 92.0 | 4.81 | 4.81 | 16,026 | 15,014 | USD |
| FH 10/1 | 35 | 2.70 | -1.62 | 4.98 | 4.22 | 99.50 | 0.68 | 110.9 | 6.04 | 6.04 | 6,056 | 5,630 | USD |
| FNMA | 800 | 1.65 | -1.01 | 4.30 | 3.02 | 100.17 | 0.61 | 74.7 | 4.61 | 4.61 | 170,484 | 171,010 | USD |
| FN 3/1 | 141 | 1.28 | -0.66 | 4.02 | 2.36 | 100.25 | 0.64 | 67.4 | 4.60 | 4.60 | 30,846 | 30,060 | USD |
| FN 5/1 | 412 | 1.61 | -1.00 | 4.43 | 2.97 | 100.22 | 0.61 | 73.1 | 4.60 | 4.60 | 104,214 | 104,680 | USD |
| FN 7/1 | 172 | 2.00 | -1.33 | 4.58 | 3.70 | 100.01 | 0.47 | 83.9 | 4.70 | 4.70 | 31,062 | 31,100 | USD |
| FN 10/1 | 80 | 2.65 | -1.60 | 4.02 | 4.13 | 99.91 | 0.66 | 105.5 | 6.00 | 6.00 | 4,362 | 4,360 | USD |
| GNMA | 12 | 1.40 | -0.77 | 4.21 | 3.14 | 100.03 | 0.67 | 70.5 | 4.65 | 4.65 | 11,719 | 11,745 | USD |
| GN 3/1 | 12 | 1.40 | -0.77 | 4.21 | 3.14 | 100.03 | 0.67 | 70.5 | 4.65 | 4.65 | 11,719 | 11,745 | USD |
| GN 5/1 | 0 | 0.00 | 0.00 | 0.00 | 0.00 | 0.00 | 0.00 | 0.0 | 0.00 | 0.00 | 0 | 0 | USD |
| GN 7/1 | 0 | 0.00 | 0.00 | 0.00 | 0.00 | 0.00 | 0.00 | 0.0 | 0.00 | 0.00 | 0 | 0 | USD |
| GN 10/1 | 0 | 0.00 | 0.00 | 0.00 | 0.00 | 0.00 | 0.00 | 0.0 | 0.00 | 0.00 | 0 | 0 | USD |

This document is for information purposes only. No part of this document may be reproduced in any manner without the written permission of Lehman Brothers Inc. Under no circumstances should it be used or considered as an offer to sell or a solicitation of any offer to buy the securities or other instruments mentioned in it. We do not represent that this information is accurate or complete and it should not be relied upon as such. Opinions expressed herein are subject to change without notice.

FIG. 5

METHODS AND SYSTEMS FOR PROVIDING HYBRID ARM INDICES

CROSS REFERENCE TO RELATED APPLICATIONS

This application claims the benefit of U.S. Provisional Application No. 60/721,786, filed Sep. 28, 2005. The entire contents of that provisional application are incorporated herein by reference.

INTRODUCTION

Adjustable-rate mortgage (ARM) mortgage-backed securities (MBS) are securities backed by a pool of mortgages having adjustable rates. In an ARM, the interest rate can change ("adjust" or "reset") during the life of the loan, with the possibility of increases and decreases to the interest rate and mortgage payments. ARMs typically adjust the interest rate periodically on the basis of the movement of a specified index (e.g., LIBOR, CMT).

Hybrid ARMs—Characteristics and Mechanics

A hybrid ARM is a mortgage in which the homeowner pays a fixed interest rate for a fixed period of time (typically 3, 5, 7, or 10 years) and a floating rate after that period. Thus, hybrid ARM MBS combine features of fixed- and adjustable-rate mortgage securities. The most popular products are 5/1s and 3/1s, accounting for over 50% and 25% of the outstanding balance in the sector, respectively. See Table 1.

Rate Index and Margins (Gross and Net)

Typically, after the fixed period, the borrower pays a floating rate equal to the rate index (usually 1 year CMT, 6-month LIBOR, or 1-year LIBOR) plus a spread, referred to as the gross margin. The gross margin is typically 225 bp for a LIBOR-based index and 275 bp for a CMT-based index. The investor in an ARM receives the net margin, which is the gross margin minus the servicing fee (typically 45-50 bp).

Cap Structure

The interest rate on the floating-rate portion typically is subject to three caps: a first reset cap, a periodic reset cap, and a lifetime cap. A first reset cap limits the amount the coupon rate can change at the first reset date. A periodic reset cap limits the amount the rate can change at any subsequent reset date. A lifetime cap limits the amount the interest rate can increase over the lifetime of the security. 3/1s typically have a 2% first reset cap while longer resets like 7/1s and 10/1s have a 5% first reset cap. 5/1s have a mix of 2% and 5% first reset caps.

IO Feature

More common to hybrid ARMs than to fixed-rates is an interest only (IO) feature. In IO loans, the borrower pays no principal during the first few years of the loan, and then makes larger payments including principal to amortize the loan over a shorter time. The IO period may or may not coincide with the fixed-rate period.

Quoting Conventions

Agency hybrid prices are quoted at a Z-spread at 15 CPB (CPR to balloon date). Z-spread is a cash flow spread to the Treasury curve. CPB is comparable to CPR,[1] but is based on a balloon date rather than a maturity date, and assumes that the floating leg (floating rate portion) is worth par on the first reset date.

Trading and Settlement

Hybrids trade and settle in a manner very similar to fixed-rates. Agency hybrids settle with other class D securities such as fixed-rate balloons, usually between the 22nd and the 24th of the month. The delay on FNMA, FHLMC, and GNMA pools is 24, 44, and 19 days, respectively. There was no hybrid TBA market as of July 2005, so all hybrids traded as specified pools.

TABLE 1

Hybrid Nomenclature and Typical Structures

| Program | |
|---|---|
| 5/1 | Fixed-rate for 5-year; then it resets to 1-year rate |
| | Caps |
| 2/2/5 | The first '2' stands for the first reset cap |
| | The next '2' is the subsequent period cap |
| | The '5' is the lifetime cap |
| | The first and lifetime caps are versus the initial rate |
| | Typical Cap Structures |
| 3/1 s | 2/26 |
| 5/1 s | 2/2/6, 5/2/5, and 5/2/6 |
| 7/1 s | 5/2/5, 6/2/6 |
| GNs | 1/1/5 |
| | Typical Margins, bp |
| LIBOR | 180 (net) and 225 (gross) |
| CMT | 225 (net) and 275 (gross) |

[1] CPR (constant prepayment rate) refers to a prepayment model that assumes an annual constant mortgage prepayment rate each month relative to the then-outstanding principal balance of a pool of mortgages for the life of that pool. For example, at 6% CPR, the CPR model assumes that the monthly prepayment rate will be constant at 6% per annum.

The prepayment and risk characteristics of hybrid ARMs are significantly different from those of fixed-rate MBS. The differences arise not only from the structure of the loan (i.e., having the floating rate period after the first few years) but also due to the nature of the underlying borrowers. Borrowers with a shorter horizon are more likely to end up in a hybrid ARM pool, so the turnover on hybrids is typically faster than that of fixed-rate MBS. In addition, the credit characteristics of hybrid borrowers are typically worse than the comparable fixed-rate borrower, slowing the pace of refinancings.

Figure 1:
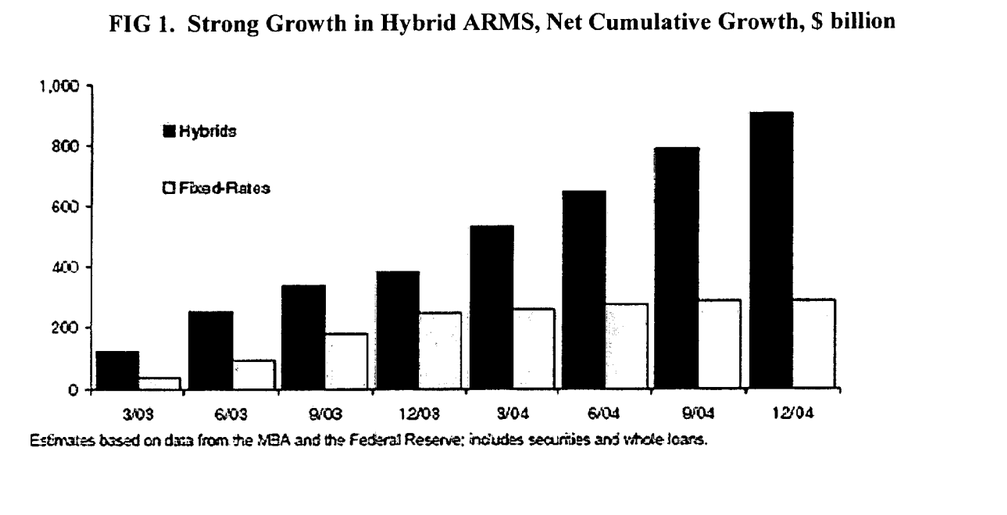
FIG. 1 depicts growth in hybrid ARMS, from March 2003 through December 2004.
Figure 2:
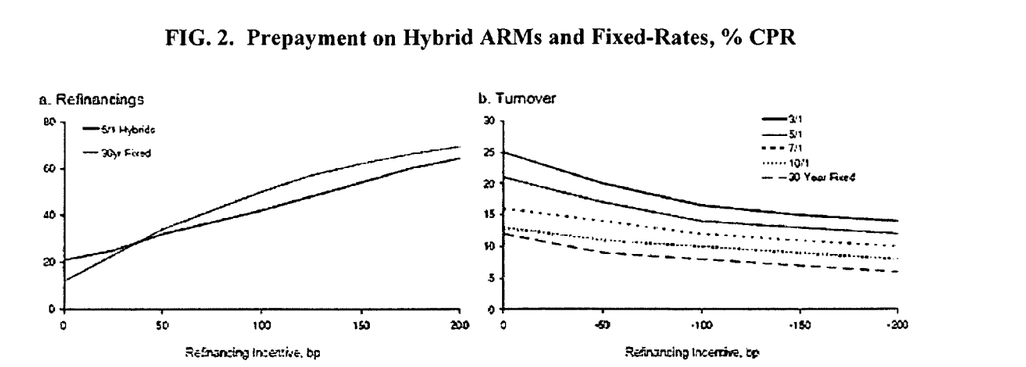
FIG. 2 compares hybrid ARMs to fixed rates.

Hybrid ARMs have faster speeds (rates of repayment) in a discount environment (turnover) due to the self selection of shorter-horizon borrowers into the product. Base case turnover on 5/1s is approximately 20% CPR, compared with 11% CPR on 30-year fixed-rates (see FIG. 2). These faster speeds persist even in a deep discount environment. Fixed-rates that are 200 bp out of the money pay at about 6%-7% CPR, while 5/1 hybrids pay at about 12% CPR. The self selection of shorter horizon borrowers is more prevalent in shorter hybrids; hence, turnover is much faster in 3/1s than longer reset hybrids. The turnover for 10/1s is not significantly different from that of fixed-rates.

Although base case speeds on hybrids are faster, premium speeds on hybrids are similar to or slightly slower than fixed-rates. Within agencies, hybrid borrowers typically have slightly worse credit characteristics than their fixed-rate counterparts, resulting in slightly slower refinancings. Hybrid pools with a 200 bp refinancing incentive pay about 4%-5% CPR slower than comparable fixed-rates.

The risk characteristics of hybrids are obviously different from fixed-rates, given the differences in prepayment speeds. For example, a 5/1 hybrid ARM MBS differs from a fixed-rate MBS. Also, risk exposures change across hybrids, as illustrated below.

Shorter duration: A 5/1 hybrid has a shorter duration than a comparable 30-year fixed rate mortgage. This is understandable, given the floating-rate back-end cash flows on these securities, as well as the faster base case speeds and turnover of the underlying borrowers (see Table 2).

More short-end exposure: Compared with 30-year fixed-rates, 5/1 hybrids have much more exposure to the front end of the yield curve.

Lower volatility exposure: 5/1 hybrid ARMs are short less convexity and volatility exposure than their fixed-rate counterparts.

Spread sensitivity: The spread sensitivity of 5/1 hybrid ARMs is much lower than that of a fixed-rate mortgage.

Trends Across ARM Products

Across products, hybrid ARMs look more and more like fixed-rates as the fixed period increases (see Table 2):

The duration and curve exposure of 7/1s, for instance, is fairly similar to that of comparable 15-year TBAs. Shorter resets such as 3/1s, on the other end, are substantially shorter than fixed-rates and have more exposure to the front-end rates.

The convexity and volatility exposure of hybrid ARMs increases from 3/1s to longer resets, which are very similar to 15-year TBAs. Shorter resets, on the other hand, have very low volatility exposure, both realized and implied.

Finally, the spread sensitivity of longer-reset hybrids is similar to that of fixed-rates, while shorter resets have very limited exposure to spreads. Further, longer reset spreads are more correlated with fixed-rates. 3/1 spreads, on the other hand, have relatively lower correlation with fixed-rate spreads.

Overall, hybrids look more like fixed-rate mortgages because the fixed period increases from 3/1s into 10/1s.

TABLE 2

Risk Exposures Across Hybrids and in Comparison to Fixed Rates

| | Coupon | Price | Curve Exposure, yrs | | | OAD | Vega | OAC |
|---|---|---|---|---|---|---|---|---|
| | % | $ | 2 yr | 5 yr | 10 yr | Yrs | yrs | Yrs |
| 3/1 | 4.0 | 99–15 | 1.1 | 1.2 | −0.3 | 2.1 | −1.0 | −0.5 |
| 5/1 | 4.5 | 99–28 | 0.8 | 1.6 | −0.1 | 2.3 | −2.2 | −0.8 |
| 7/1 | 4.5 | 99–11 | 0.9 | 1.6 | 0.3 | 2.8 | −2.9 | −1.2 |
| 15 Yr | 4.5 | 99–04 | 0.9 | 1.3 | 1.2 | 3.4 | −4.2 | −1.3 |
| 30 Yr | 5.0 | 99–13 | 0.9 | 1.0 | 1.9 | 3.8 | −7.0 | −2.5 |

Current Coupons; Hybrid ARM valuations to maturity.
As of Jul. 12, 2005.

The Need for a Hybrid Index

There has been strong issuance in hybrid ARMs in the past five years, and the amount of agency hybrids outstanding is now approaching $300 billion. In addition, mortgage investors are increasingly using the product and need a benchmark to track the performance of the sector.

SUMMARY

At least one embodiment of the present invention provides new benchmarks based on three criteria: 1) relevance of an asset class; 2) investor demand for a performance metric; and 3) the availability of security level pricing and analytics to create an objective rules-based benchmark. For ease of reference, one embodiment is referred to herein as the U.S. Hybrid Adjustable Rate Mortgage (ARM) Index.

Index Eligibility Rules

A preferred embodiment encompasses only agency issuers. Hybrid pool aggregates must have at least 12 months to floating coupon reset date and an outstanding balance greater than $250 million.

Structure and Size of the Index

The structure of the hybrid index preferably is similar to the agency fixed-rate index in many respects. One notable difference is the existence of sub-aggregates based on the rate index, cap structure, and IO features, which are used for more accurate pricing. At inception, the index will have approximately 150 aggregates and 1,200 sub-aggregates and an estimated $275 billion amount outstanding.

Pricing and Return Calculations

Trader quotes for unseasoned securities and pay-ups for seasoned securities are used to price the index at the sub-aggregate level. The return computation method for the hybrid Index is similar to that used for the MBS fixed-rate index.

In at least one aspect, the invention comprises a method comprising: constructing one or more hybrid adjustable rate mortgage aggregates based on one or more of: agency, program, coupon, and origination year; for each of one or more of the aggregates, constructing one or more sub-aggregates based on one or more of: rate-index, capitalization structure, and existence of interest-only feature; mapping pools of adjustable rate mortgages to the aggregates and sub-aggregates; constructing an index based on the mapping; and pricing the index.

In various embodiments: (1) the method further comprises recalculating the mapping periodically based on weighted average loan age; (2) the method further comprises selecting the pools based on inclusion rules based on one or more of: liquidity, time to reset date, and agency affiliation; (3) the pricing comprises pricing sub-aggregates using a PSA standard settlement day each month; (4) the pricing comprises using a same day settlement convention; (5) the same day settlement convention is a same day index settlement convention; (6) if an index settlement day and a PSA settlement day for a sub-aggregate occur in the same month, pricing the index comprises adjusting a PSA settlement quote for cost of carry until settlement; (7) if an index settlement day and a PSA settlement day for a sub-aggregate occur in different months, pricing the index comprises including an additional payment of principal and interest; (8) the method further comprises assuming that a next month's single monthly mortality will be the same as a present month's single monthly mortality; (9) the pricing comprises accounting for monthly pool factor reports that occur on different days of a month all on one day of each month; and (10) the pricing comprises: using market pricing of the most liquid components of the index to price the most liquid components; and using a prepayment model, in combination with pricing information of the most liquid components, to price the remaining components of the index.

In at least one other aspect, the invention comprises an index comprising: one or more hybrid adjustable rate mortgage aggregates constructed based on one or more of: agency, program, coupon, and origination year; wherein, for each of one or more of the aggregates, one or more sub-aggregates are constructed based on one or more of: rate-index, capitalization structure, and existence of interest-only feature; wherein pools of adjustable rate mortgages are mapped to the aggregates and sub-aggregates; and wherein the index is constructed based on the mapping.

In various embodiments: (1) the mapping is recalculated periodically based on weighted average loan age; (2) the pools are selected based on inclusion rules based on one or more of: liquidity, time to reset date, and agency affiliation; and (3) the index is priced based on pricing sub-aggregates using a PSA standard settlement day each month.

In at least one other aspect, the invention comprises a method comprising: accessing, via a computer network, data regarding one or more of returns and statistics for the index.

In one embodiment, the method further comprises accessing an electronic database storing the data regarding one or more of returns and statistics for the index.

BRIEF DESCRIPTION OF THE DRAWINGS

FIG. 4 depicts an excess and periodic returns screen.

FIG. 5 depicts a basic statistics screen.

DETAILED DESCRIPTION OF VARIOUS EMBODIMENTS

A preferred embodiment of the present invention comprises an objective and rules-based index, representing a universe of securities meeting published eligibility criteria. To build the index, it is necessary both to identify the universe of potentially eligible securities and to define index eligibility rules with which to screen these securities.

The construction of this index preferably uses hybrid ARM aggregates (used to determine index eligibility) and sub-aggregates (used to price the index) of hybrid ARM pools.

Creation of Hybrid ARM Aggregates

Instead of using specific pools for index construction, a preferred embodiment uses pool aggregates to evaluate index eligibility. Aggregates preferably are constructed based on the following attributes: agency/program, coupon, and origination year. Within each sector (3/1s, 5/1s, etc.), pools are grouped first by coupon in increments of 0.25%. Thus, the maximum pool coupon variation within each aggregate is limited to ±0.125% around the aggregate's coupon. Each coupon group is then segregated by origination year. A pool is mapped to an origination year based on the weighted average origination year of the underlying loans, not the year the loans were securitized to create the pool.

Creation of Hybrid ARM Sub-Aggregates

One key difference between the fixed-rate and the hybrid indices is the use of "sub aggregates" in order to price the latter accurately, given the greater pool diversity beyond coupon and origination year in the hybrid universe. Within a given hybrid ARM aggregate, sub-aggregates are further defined by rate-index, cap structure, and existence of an IO feature (see Table 3). This, in one embodiment, creates a universe of approximately 2,000 sub-aggregates in total. These sub-aggregates are then treated as individual securities for purposes of pricing.

TABLE 3

Attributes Defining of Aggregates and Sub-Aggregates

| Characteristic | Values |
| --- | --- |
| Aggregates | |
| Agency | FN, FH, GN |
| Program | 3/1, 5/1, 7/1, 10/1 |
| Coupon | Quarter coupons |
| Origination Year | 01, 02, 03, 04 etc. |

TABLE 3-continued

Attributes Defining of Aggregates and Sub-Aggregates

| Characteristic | Values |
| --- | --- |
| Sub-aggregates | |
| Rate Index | 1 yLIBOR, 6 m LIBOR, 1 yCMT |
| Cap Structure | 2/2/6, 2/2/5, 5/2/5 |
| Interest Only | Yes, no |

Aggregate and Sub-Aggregate Nomenclature

Figure 3:
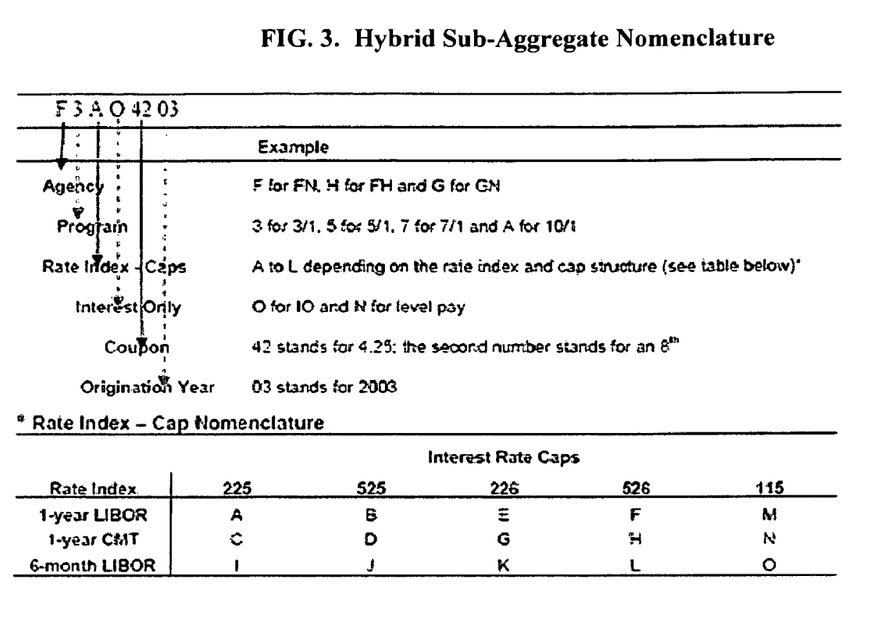
FIG. 3 illustrates preferred sub-aggregate nomenclature.

The sub-aggregates preferably are assigned 8-character identifiers ("generic cusips"). The naming convention reflects the seven dimensions along which pools are aggregated. The first two letters capture the agency and the program. Position three stands for the rate index-caps and the fourth spot represents interest only (or not). The fifth and sixth indicate the coupon. The first one shows the whole part of the coupon; the second digit shows the number of eighths. The last two characters of the 8-character cusip show the origination year. Thus, F3AO4203 denotes a Fannie Mae 3/1 with a 2/2/5 cap structure off of 1-year LIBOR, with an interest only period, a 4.25% coupon, originated in 2003 (see FIG. 3).

Mapping Pools to Sub-Aggregates and Aggregates

For purposes of computing returns and other analytics, each hybrid ARM pool is mapped onto a generic security to which it contributes its outstanding balance. This mapping may change over time, since every pool is backed by a large number of individual mortgage loans. While these loans typically are fairly homogeneous, their origination dates are not necessarily all in the same calendar year. As the underlying loans prepay, each at its own rate, the average origination date for a given pool may migrate from one year to another. Pool mappings preferably are recalculated each month based on the weighted average loan age (WALA) reported for each pool by the agencies.

For example, a FHLMC pool of 5/1 hybrids issued in February 2005 with a WALA of 3 months would be put into a generic with a 2004 origination year. By December 2005, though, uneven prepayments might bring the WALA of this pool to 11, in which case the pool would be mapped into 2005 origination. Unlike in the fixed rate index where only the WAC (weighted average coupon) of a pool might drift over time, in the Hybrid Index both the WAC and the coupon of a pool might drift. This could cause a change in the coupon (sub-aggregate) to which the pool is mapped.

Index Rules and Eligibility

A preferred embodiment has three inclusion rules to evaluate hybrid ARM aggregates:

1. Liquidity: To be included in the index, the size of a hybrid ARM aggregate must be at least $250 million. A sub-aggregate whose size is less than $250 million would still be part of the MBS index, as long as the size of the aggregate is over $250 million.

2. Time to reset date: All pools/aggregates included should have at least 12 months to the floating coupon reset date.

3. Agency affiliation: A preferred embodiment includes only agency issuers. Within the Lehman Brothers sector classification scheme, this index will be classified as Securitized>MBS Passthrough>Agency>Hybrid ARM.

In at least one embodiment, there are approximately 150 index eligible aggregates, representing 1200 index eligible sub aggregates in the hybrid ARM universe.

Index Composition at Inception

The size of one embodiment of the hybrid index at inception is just over $275 billion (see Tables 4(a)-4(f) below).

TABLE 4(a)

| | | | Program | | |
|---|---|---|---|---|---|
| | FN | FH | GN | Total | % |
| 3/1 | 31 | 15 | 12 | 58 | 21% |
| 5/1 | 104 | 57 | 0 | 161 | 58% |
| 7/1 | 31 | 16 | 0 | 47 | 17% |
| 10/1 | 4 | 6 | 0 | 10 | 4% |
| Total | 170 | 94 | 12 | 276 | 100% |

TABLE 4(b)

| | | | | Coupon Distribution | | | | | |
|---|---|---|---|---|---|---|---|---|---|
| | <=3.5 | 3.75 | 4.0 | 4.25 | 4.5 | 4.75 | 5.0 | 5.25 | >=5.5 | Total |
| 3/1 | 15 | 9 | 9 | 9 | 9 | 3 | 3 | 0 | 0 | 58 |
| 5/1 | 5 | 12 | 24 | 34 | 35 | 32 | 14 | 3 | 2 | 161 |
| 7/1 | 0 | 0 | 4 | 7 | 10 | 15 | 9 | 2 | 0 | 47 |
| 10/1 | 0 | 0 | 0 | 0 | 1 | 2 | 5 | 2 | 0 | 10 |
| Total | 20 | 22 | 37 | 50 | 55 | 51 | 31 | 8 | 2 | 276 |

TABLE 4(c)

| | | Rate Indices | | |
|---|---|---|---|---|
| | CMT | 6 m L | 1 yr L | Total |
| 3/1 | 28 | 3 | 27 | 58 |
| 5/1 | 60 | 15 | 86 | 161 |
| 7/1 | 24 | 2 | 21 | 47 |
| 10/1 | 6 | 1 | 3 | 10 |
| Total | 118 | 21 | 137 | 276 |

TABLE 4(d)

| | | Origination Year | | | |
|---|---|---|---|---|---|
| | 2002 | 2003 | 2004 | 2005 | Total |
| 3/1 | 0 | 8 | 38 | 12 | 58 |
| 5/1 | 10 | z | 71 | 30 | 161 |
| 7/1 | 2 | 19 | 19 | 6 | 47 |
| 10/1 | 0 | 3 | 5 | 2 | 10 |
| Total | 13 | 79 | 133 | 51 | 276 |

TABLE 4(e)

| | IO Loans | | |
|---|---|---|---|
| | IO | LP | Total |
| 3/1 | 17 | 41 | 58 |
| 5/1 | 52 | 109 | 161 |
| 7/1 | 12 | 35 | 47 |
| 10/1 | 2 | 8 | 10 |
| Total | 85 | 192 | 276 |

TABLE 4(f)

| | Cap Structure | | | | |
|---|---|---|---|---|---|
| | 5/2/6 | 2/2/6 | 5/2/5 | 2/2/5 | Total |
| 3/1 | 3 | 43 | 0 | 12 | 58 |
| 5/1 | 38 | 33 | 74 | 17 | 161 |
| 7/1 | 20 | 0 | 27 | 0 | 47 |
| 10/1 | 6 | 0 | 4 | 0 | 10 |
| Total | 66 | 76 | 105 | 29 | 276 |

The following are noteworthy trends across different dimensions:

Agency: FNMA and FHLMC account for $170 billion and $94 billion of the total outstanding balance, respectively. GNMA's hybrid ARM program is relatively new and has about $12 billion.

Program: 5/1s are the largest component of the index, with $161 billion outstanding. 3/1s are the second-largest program, with $58 billion outstanding in the index, followed by 7/1s and 10/1s.

Origination year: Most of the loans in the index originated in 2003 and 2004, but obviously the share that was originated in 2005 is continuing to grow.

Rate index: The share of LIBOR-based indices is about 60% of the total.

Cap structure: The most common cap structures in the hybrid index are 5/2/5, 5/2/6, and 2/2/6. Each of these three cap structures constitutes 25%-35% of the index. 3/1s typically have a 2% first reset cap, while longer resets such as 7/1s and 10/1s have a 5% first reset cap. 5/1s have a mix of 2% and 5% first reset caps.

IO loans: Approximately 30% of the index is made up of interest only loans, but this fraction is likely to grow because the share of IO loans in agency hybrid originations has increased to over 50%.

Index Assumptions: Pricing, Coupon, and Prepayment Returns

There are similarities in the pricing and return calculation methods of the fixed-rate U.S. MBS Index and a preferred embodiment. One source for detailed return calculations is in the Quantitative Portfolio Strategies paper, Managing Against the Lehman Brothers MBS Index: Prices and Returns, B. Phelps, J. Mann, Lehman Brothers, November 2003. Here are some key points:

(A) Same Day Settlement Pricing Versus PSA Settlement Pricing

The preferred embodiment uses same day settlement pricing assumptions to calculate index returns (similar to the fixed-rate MBS index). Once a price quote is obtained for a sub aggregate, it must be adjusted for the difference between index and market settlement conventions. A single standard settlement day each month is used by the Bond Market Association (formerly Public Securities Association, or PSA) for agency hybrids. Quoted prices for sub-aggregates are for this standard PSA settlement. The preferred hybrid index, however, uses a same day settlement convention to reflect the current market value of securities held by the index. The discrepancy between the settlement convention used for quotes and for pricing the index necessitates price adjustments of two types. First, a pure adjustment of forward prices to spot prices reflects the cost of carry. More important, when the index and PSA settlement dates are in different months, the index price includes one more payment of principal and interest.

(B) Two Types of Price Adjustments

If the index and PSA settlement dates are in the same month, the index adjusts the PSA settlement quote for the cost of carry until settlement. This is sufficient because a purchase that settles on April 3, for example, will entitle the buyer to the identical set of cash flows as a purchase that settles on April 24 since each monthly cash flow belongs to the owner of record at the end of the month. The situation at or near the end of the month is different. The trader quote on April 28 is for May PSA settlement. Such a purchase will entitle the buyer to receive cash flows from this security starting in June.

(C) Adjusting Quote for Additional Cash Flows

A purchase for immediate settlement (or an existing position) would entitle the owner to an additional payment of principal and interest in May. In this case, the index settlement price is backed out to match the sum of the present values of the following two quantities. The first principal and interest cash flow (which would be received in May) is discounted from the payment date back to the present. The position remaining after this paydown is valued by discounting the quoted price and the appropriate accrued interest from the PSA settlement date back to the present. This calculation is complicated by the May cash flow, which is the subject of this adjustment and is not yet known. Rather than projecting it using a complicated (and subjective) prepayment model, one may use the simple approximation that next month's single monthly mortality (SMM), or percentage of outstanding prepaid, will be equal to the most recently observed quantity. In another embodiment, the Lehman Brothers Hybrid ARM Prepayment Model is used (see The Hybrid ARM Handbook, by Vikas Reddy and Marianna Fassinotti, published Nov. 21, 2003, and incorporated herein by reference).

(D) Returns on Individual Generics

Because hybrid passthroughs are amortizing securities, their realized return always consists of two parts: the return on the portion of the initial investment that remains in securitized form, and the return on the portion paid out as cash. Thus, all return calculations will be affected by the remaining balance and paid down amount numbers, which in turn depend on the current month prepayment estimate.

(E) All Factor Information Updated on 16th Business Day

While all events that affect the preferred embodiment are essentially monthly in nature, they occur throughout the month. The agencies issue monthly pool factor reports on different days for different types of hybrids. There may also be one or more updates following the initial factor release. To simplify index calculations, our preferred convention is to address each of these monthly events simultaneously for all securities in the index. Pool factor updates are not applied to the index database in a piecemeal fashion as they come in. Instead, factors are updated all at once after the last factor update is received. Preferably, the last factor update for the previous month is received on the 15th business day of each month. Starting on the next business day, the SMM computed from the previous month's factors begins to serve as the estimate for the current month's prepayment. This convention ensures that all securities progress through the same sequence of calculations in the course of a month, regardless of their individual characteristics.

(F) Paydown Return Realized on First Day of the Month

For purposes of the index, both interest and principal components of the received cash flow contribute to the paydown return, while coupon return is based on only the surviving portion. Because the beginning or "base" value for all return calculations is the last day of the previous month, on the first day of the current month the mortgage security "sheds" one cash flow. Thus, the full paydown return for the month is realized on the first day of the month.

Advancement into a month determines which month's prepayment is used as an estimate in computing month-to-date returns. At the beginning of April, the March factors are not yet available for some securities in the index, so the February prepayment is used as an estimate for all securities in the index. When on the 16th business day the factors are updated for the index, the March prepayment begins to serve as the estimate.

These switches in prepayment estimates may lead to discontinuities in the daily sequence of month-to-date returns. If prepayments change little from one month to the next, the effect is negligible. When there is a significant change in prepayments, this discontinuity can become noticeable (particularly in the paydown return). Investors who closely monitor month-to-date returns need to be aware of this potential discontinuity.

(G) Coupon Returns Based on 30/360 Convention

The coupon return calculation for the preferred Hybrid Index reflects the 30/360 day count convention and makes monthly coupon flows independent of the actual number of days in a particular month. In the end-of-month return calculation, accrued interest is brought up to the full monthly coupon (30 days accrual), regardless of the actual number of days in the month. For end-of-month calculations, the Hybrid Index is assumed always to settle on the last day of the month, whether it is a business day or not. So if the last business day happens to be the 27th, the accrued interest on that day will jump from 26 days worth up to the full monthly coupon. For a 4.5% passthrough, for example, the accrued interest will go from 4.5×26/360 (+0.325%) directly to 4.5×30/360 (+0.375%) instead of to 8×27/360 (+0.338%).

In one embodiment, pricing comprises using market pricing of the most liquid components of the index to price those components; and using a prepayment model, in combination with pricing information of the most liquid components, to price the remaining ("less liquid") components of the index. An example of "most liquid" components would be recently issued pools (e.g., issued within the past six months).

In one embodiment, there may be three sources to monitor index performance: LehmanLive (Index Website), POINT, and Bloomberg.

LehmanLive: Investors may retrieve index returns and statistics from the Fixed Income Indices section on LehmanLive. This site allows entitled users to access and download historical index returns and statistics of the entire Global Family of Fixed Income Indices back to each index's inception date. Go to the Fixed Income page and click on "Fixed Income Indices." The U.S. Hybrid ARM Index link will be listed as a separate page under "Other Americas."

POINT: For investors with access to POINT, Lehman's risk management and portfolio analysis tool, the index returns and statistics is retrievable by loading the U.S. Hybrid ARM Index.

Bloomberg: Type LEHM<GO> to go to the index selection screen for Lehman's Global Family of Indices. Select "Other" from the U.S. & Canada column, then select U.S. Hybrid ARM Index. This will provide the monthly and daily index returns and statistics.

FIGS. 4 and 5 depict some example reports and data found on LehmanLive. FIG. 4 depicts an excess and periodic returns screen, and FIG. 5 depicts a basic statistics screen.

Embodiments of the present invention comprise computer components and computer-implemented steps that will be apparent to those skilled in the art. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

For example, all calculations preferably are performed by one or more computers. Moreover, all notifications and other communications, as well as all data transfers, to the extent allowed by law, preferably are transmitted electronically over a computer network. Further, all data preferably is stored in one or more electronic databases.

In general, although particular embodiments of the invention have been described in detail for the purpose of illustration, it is to be understood that such detail is solely for that purpose and that variations can be made thereof by those skilled in the art without departing from the scope of the invention, which should be determined exclusively from the plain wording of the appended claims. Any details in the specification that are not included in the claims themselves should not be construed as limiting the scope of the invention.

APPENDIX A

Lehman Brothers U.S. MBS Index Research Publications

Managing Against the Lehman Brothers MBS Index: Evaluating Measures of Duration, L. Dynkin, B. Phelps, J. Mann, Lehman Brothers, April 2005.

Managing Against the Lehman Brothers MBS Index: Pools vs. Annual Aggregates, B. Phelps, Lehman Brothers, June 2004.

Managing Against the Lehman Brothers MBS Index: Prices and Returns, B. Phelps, J. Mann, Lehman Brothers, November 2003.

Managing Against the Lehman Brothers MBS Index: Returns versus Statistics Duration, B. Phelps, J. Mann, Lehman Brothers, August 2003.

MBS Index Returns: A Detailed Look, L. Dynkin, J. Hyman, V. Konstantinovsky, N. Roth, Lehman Brothers, August 1998.

APPENDIX B

Alternate Hybrid Model

In an alternative embodiment ("updated model"), the hybrid model described above ("existing model") has the following changes.

Turnover: The turnover differences between shorter and longer resets are recalibrated to bring them in line with expectations. While the existing model turnover on 5/1s is only about 1% CPR slower than expectations, the same is not true for other resets. In particular, 3/1s have prepaid much faster than the existing model, even in relatively weaker housing markets, and 10/1s much slower than the model. The changes increase turnover on 3/1s and 5/1s by 4% and 1% CPR, respectively. Turnover on 7/1s is unchanged, and 10/1s are 2% CPR slower (see Tables 5 and 6).

Refinancings: Current coupon speeds are slightly faster, and very deep in-the-money speeds are slightly lower. There are some additional changes on the refinance side:

Increased SATO Effect: There is a very pronounced effect of SATO on refinancings. For example, a newly originated 3 SATO pool in 2004-2005 prepaid about 20% CPR slower than a prime pool, for about a 100 bp rate incentive. While the existing model captures this effect somewhat, it is not strong enough. We compare 5/1 projections for a 0 SATO and 3 SATO pool for the existing and updated models in Table 5.

TABLE 5

Difference between 0 SATO and 3 SATO Projections for 5/1 s, % CPR

| Rate Incentive | Existing Model | | Updated Model, % CPR | |
| --- | --- | --- | --- | --- |
| (bp) | 0 WALA | 12 WALA | 0 WALA | 12 WALA |
| 0 | 0 | 0 | 0 | 0 |
| 50 | 2 | 3 | 4 | 6 |
| 100 | 5 | 5 | 8 | 10 |
| 150 | 6 | 2 | 11 | 5 |
| 200 | 4 | 2 | 10 | 4 |

After Reset Speeds: The model compares the floating leg rate paid by the borrower with available hybrid rates for new mortgages. The existing model is predicting peak speeds of 60% CPR just after reset on agency 3/1s, declining to 50% CPR after two years which is in line with our expectations. However, we have increased the after reset rate sensitivity for Jumbo and Jumbo-Alt-A borrowers.

Increased Model Burnout: We have limited information on burnout in hybrids. However, burnout in the existing model is much smaller than what we observe in fixed rates. We have increased the effect of burnout in the model to bring it more in line with the fixed rate model.

Valuation Implications for Agency 5/1s

Table 6 summarizes the effects of the prepayment model changes on various risk and valuation measures for agency 5/1s. The LIBOR OAS of discount cohorts are mostly unchanged and significantly wider for pools originated as premiums (high SATO pools). The OAS profile in the updated model is much flatter than the existing model. Durations shorten for discounts, due to about 1% CPR higher turnover, and lengthen for newly originated premiums, due to higher SATO and greater burnout.

TABLE 6

Valuation Effect on 0 WALA Agency 5/1 s*

| | | | Existing Model | | | | Updated Model | | | |
|---|---|---|---|---|---|---|---|---|---|---|
| Cpn | Price | SATO | OAS | OAD | OAC | Opt Cost | OAS | OAD | OAC | Opt Cost |
| 4 | 98–31+ | –3 | 6 | 2.77 | –0.8 | 25 | 8 | 2.70 | –0.8 | 24 |
| 4.5 | 100–07+ | –1.5 | 7 | 2.25 | –1.2 | 31 | 6 | 2.12 | –1.2 | 31 |
| 5 | 101–07+ | 0 | 2 | 1.44 | –1.4 | 43 | 3 | 1.54 | –1.1 | 36 |
| 5.5 | 102–02+ | 1.5 | –12 | 0.80 | –0.9 | 29 | –1 | 1.17 | –0.7 | 23 |
| 6 | 102–28 | 3 | –38 | 0.38 | –0.3 | 9 | –4 | 1.03 | –0.4 | 11 |

*As of Jun. 23, 2005

Valuations Across Products and Sectors

We summarize below the main changes across product and sectors types from the model changes. More detailed information is available in Appendix C.

Agency Collateral

3/1s: Discount and premium OASs tighten on 3/1s by 3-4 bp.

7/1s: Results are similar to 5/1s.

10/1s: Durations on current coupons and discounts are longer by 0.2-0.3 years, and OASs are tighter by 2-3 bp.

Non-Agency Collateral

Jumbo: Results are similar to agency collateral with similar reset.

Jumbo Alt-A: The widening in premiums is more pronounced for Alt-A collateral due to a stronger SATO effect.

APPENDIX C

Valuation Across Product Types and Sectors for Existing and Updated Models

Across Product Types

TABLE 7(a)

| | | Existing | | | | Updated | | | |
|---|---|---|---|---|---|---|---|---|---|
| Agency 5/1 s | | | | | Opt | | | | Opt |
| Cpn | Price | OAS | OAD | OAC | Cost | OAS | OAD | OAC | Cost |
| 4.5 | 100–07+ | 7 | 2.20 | –1.2 | 32 | 6 | 2.12 | –1.2 | 31 |
| 5.5 | 102–02+ | –12 | 0.80 | –0.9 | 29 | –1 | 1.17 | –0.7 | 23 |

TABLE 7(b)

| | | Existing | | | | Updated | | | |
|---|---|---|---|---|---|---|---|---|---|
| Agency 3/1 s | | | | | Opt | | | | Opt |
| Cpn | Price | OAS | OAD | OAC | Cost | OAS | OAD | OAC | Cost |
| 4.5 | 99–19+ | 14 | 1.99 | –0.8 | 16 | 10 | 1.86 | –0.7 | 16 |
| 5.5 | 101–06+ | 1 | 0.93 | –1 | 24 | –2 | 1.08 | –0.7 | 19 |

TABLE 7(c)

| | | Existing | | | | Updated | | | |
|---|---|---|---|---|---|---|---|---|---|
| Agency 7/1 s | | | | | Opt | | | | Opt |
| Cpn | Price | OAS | OAD | OAC | Cost | OAS | OAD | OAC | Cost |
| 4.5 | 99–22+ | 3 | 2.73 | –1.2 | 40 | 2 | 2.78 | –1.3 | 40 |
| 5.5 | 101–19+ | –13 | 1.00 | –1.5 | 53 | 1 | 1.46 | –1.3 | 47 |

As of Jun. 23, 2005

Across Sectors

TABLE 7(d)

| Agency 5/1 s | | Existing | | | | Updated | | | |
|---|---|---|---|---|---|---|---|---|---|
| Cpn | Price | OAS | OAD | OAC | Opt Cost | OAS | OAD | OAC | Opt Cost |
| 4.5 | 100-07+ | 7 | 2.20 | -1.2 | 32 | 6 | 2.12 | -1.2 | 31 |
| 5.5 | 102-02+ | -12 | 0.80 | -0.9 | 29 | -1 | 1.17 | -0.7 | 23 |

TABLE 7(e)

| Jumbo 5/1 s | | Existing | | | | Updated | | | |
|---|---|---|---|---|---|---|---|---|---|
| Cpn | Price | OAS | OAD | OAC | Opt Cost | OAS | OAD | OAC | Opt Cost |
| 4.5 | 99-19+ | 23 | 2.18 | -1.3 | 33 | 26 | 2.25 | -1.0 | 31 |
| 5.5 | 101-06+ | 9 | 0.65 | -0.9 | 29 | 19 | 0.95 | -0.8 | 26 |

TABLE 7(f)

| Jumbo Alt-A 5/1 s | | Existing | | | | Updated | | | |
|---|---|---|---|---|---|---|---|---|---|
| Cpn | Price | OAS | OAD | OAC | Opt Cost | OAS | OAD | OAC | Opt Cost |
| 4.5 | 99-22+ | 23 | 2.25 | -1.2 | 31 | 26 | 2.30 | -1.0 | 28 |
| 5.5 | 101-19+ | 1 | 0.74 | -0.9 | 28 | 19 | 1.22 | -0.8 | 23 |

As of Jun. 23, 2005.

We claim:

1. A non-transitory computer readable storage medium having computer executable instructions recorded thereon that when executed on a computer, configure the computer to perform a method comprising:
   constructing one or more hybrid adjustable rate mortgage aggregates based on one or more of: agency, program, coupon, and origination year;
   constructing, for each of one or more of said aggregates, one or more sub-aggregates based on one or more of: rate-index, capitalization structure, and existence of interest-only feature;
   mapping pools of adjustable rate mortgages to said aggregates and sub-aggregates; and
   constructing an index based on said mapping.

2. The non-transitory computer readable storage medium as in claim 1, wherein said mapping is recalculated periodically based on weighted average loan age.

3. The non-transitory computer readable storage medium as in claim 1, wherein said pools are selected based on inclusion rules based on one or more of: liquidity, time to reset date, and agency affiliation.

4. The non-transitory computer readable storage medium as in claim 1, wherein said index is priced based on pricing sub-aggregates using a Pooling and Service Agreement standard settlement day each month.

5. The non-transitory computer readable storage medium as in claim 1, wherein the method further comprises storing in an electronic database storing said data regarding one or more of returns and statistics for said index.

6. The non-transitory computer readable storage medium as in claim 1, wherein said index is priced based on using a same day settlement convention.

7. The non-transitory computer readable storage medium as in claim 6, wherein said same day settlement convention is a same day index settlement convention.

8. The non-transitory computer readable storage medium as in claim 7, wherein, if an index settlement day and a Pooling and Service Agreement settlement day for a sub-aggregate occur in the same month, said index is priced based on adjusting a Pooling and Service Agreement settlement quote for cost of carry until settlement.

9. The non-transitory computer readable storage medium as in claim 7, wherein, if an index settlement day and a Pooling and Service Agreement settlement day for a sub-aggregate occur in different months, said index is priced based on including an additional payment of principal and interest.

10. The non-transitory computer readable storage medium as in claim 9, wherein a next month's single monthly mortality is assumed to be the same as a present month's single monthly mortality.

11. The non-transitory computer readable storage medium as in claim 1, wherein said index is priced based on accounting for monthly pool factor reports that occur on different days of a month all on one day of each month.

12. The non-transitory computer readable storage medium as in claim 1, wherein said index is priced based on:
   using market pricing of the most liquid components of said index to price said most liquid components; and using a prepayment model, in combination with pricing information of said most liquid components, to price the remaining components of said index.

13. A computer system comprising:
memory operable to store at least one program; and
at least one processor communicatively coupled to the memory, in which the at least one program, when executed by the at least one processor, causes the at least one processor to:
construct one or more hybrid adjustable rate mortgage aggregates based on one or more of: agency, program, coupon, and origination year;
construct for each of one or more of said aggregates, one or more sub-aggregates based on one or more of: rate-index, capitalization structure, and existence of interest-only feature;
map pools of adjustable rate mortgages to said aggregates and sub-aggregates;
construct an index based on said mapping; and
price said index.

14. The computer system as in claim 13, wherein the processor is further caused to said mapping periodically based on weighted average loan age.

15. The computer system as in claim 13, wherein the processor is further caused to select said pools based on inclusion rules based on one or more of: liquidity, time to reset date, and agency affiliation.

16. The computer system as in claim 13, wherein said pricing said index comprises pricing sub-aggregates using a Pooling and Service Agreement standard settlement day each month.

17. The computer system as in claim 13, wherein said pricing said index comprises using a same day settlement convention.

18. The computer system as in claim 17, wherein said same day settlement convention is a same day index settlement convention.

19. The computer system as in claim 18, wherein, if an index settlement day and a Pooling and Service Agreement settlement day for a sub-aggregate occur in the same month, pricing said index comprises adjusting a Pooling and Service Agreement settlement quote for cost of carry until settlement.

20. The computer system as in claim 18 wherein, if an index settlement day and a Pooling and Service Agreement settlement day for a sub-aggregate occur in different months, pricing said index comprises including an additional payment of principal and interest.

21. The computer system as in claim 20, wherein a next month's single monthly mortality is assumed to be the same as a present month's single monthly mortality.

22. The computer system as in claim 13, wherein said pricing said index comprises accounting for monthly pool factor reports that occur on different days of a month all on one day of each month.

23. The computer system as in claim 13, wherein said pricing said index comprises:
using market pricing of the most liquid components of said index to price said most liquid components; and
using a prepayment model, in combination with pricing information of said most liquid components, to price the remaining components of said index.

24. The computer system as in claim 13, further comprising an electronic database storing said data regarding one or more of returns and statistics for said index.

* * * * *